Dec. 3, 1957    W. HIGHWOOD    2,815,129
PIE PLATE RACK
Filed May 31, 1955
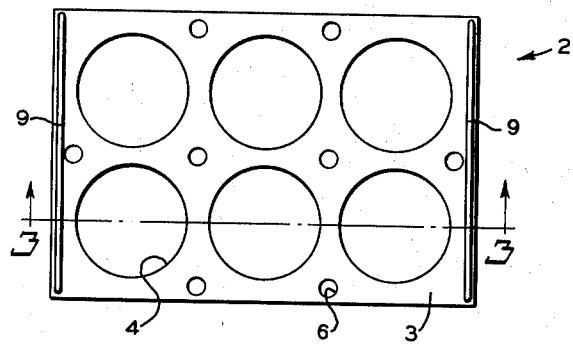
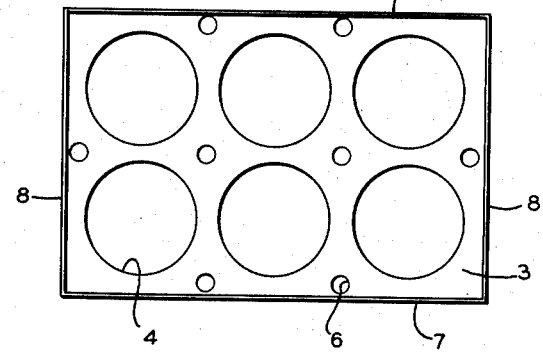
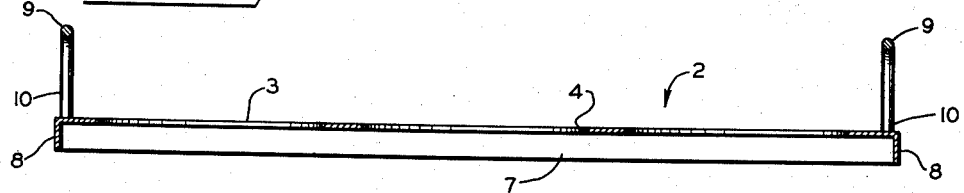
INVENTOR.
WILLIAM HIGHWOOD
BY
DES JARDINS, ROBINSON & KEISER
HIS ATTORNEYS

United States Patent Office 2,815,129
Patented Dec. 3, 1957

2,815,129

PIE PLATE RACK

William Highwood, Cincinnati, Ohio

Application May 31, 1955, Serial No. 512,158

4 Claims. (Cl. 211—41)

This invention relates to a pie plate rack for baking and storing pies, and it particularly pertains to a sheet metal pie plate rack which is sanitary, easy to clean, will provide even heat and air distribution and can be stacked in nested relation with similarly constructed racks, without relative lateral displacement, so that the whole stack or only the top one of the racks of the stack can be lifted as desired.

Racks for baking and storing pies heretofore used have been made of woven wire or rods, and in such construction there are many nooks and crevices into which drippings from the pie filling fall to become incrusted therein during baking. These incrustations are difficult to remove and entail much labor in cleaning the racks. Moreover, these racks have not been of a construction to provide for stacking in nesting relation, except perhaps when unfilled or with the pies removed. Accordingly, such racks do not permit stacking of the pies either while being baked or when stored before or after baking. Consequently, a much less number of pies can be baked at any one time unless spacing trays are used for supporting each of the racks. The racks of the present invention permit stacking without the use of intervening spacing trays.

Accordingly, one of the main objects of this invention is a baking and storage pie rack which is simple in construction and efficient in operation.

Another object of the invention is a baking and storage pie rack which is sanitary and easily cleaned.

Another object of the invention is a baking and storage pie rack which can be nested in stacked relation when filled with pies of when empty.

Another object of the invention is a baking and storage pie rack which provides for stacking in the oven without the use of spacing trays.

Further objects, and objects relating to details of construction and economies of operation, will readily appear from the detailed description to follow. In one instance, the objects of the invention have been accomplished by the device and means set forth in the following specification. The invention is clearly defined and pointed out in the appended claims. A structure constituting a preferred embodiment of the invention is illustrated in the accompanying drawings, forming a part of this specification, in which:

Fig. 1 is a top plan view of a pie plate rack embodying the invention.

Fig. 2 is a bottom plan view of the pie plate rack.

Fig. 3 is a cross-section on line 3—3 of Fig. 1.

Fig. 4 is a side elevation of two of the racks stacked in nested relation.

Referring specifically to the drawings in which like numerals designate like parts, numeral 2 refers generally to a pie plate rack having a sheet metal bottom 3 with a plurality of longitudinal and transverse rows of openings 4, each of the openings being of a diameter to receive the bottom projection of a conventional pie plate seated therein. Between these transverse and longitudinal rows of pie plate openings, and alternately disposed in staggered relation, are small openings 6 which provide for the circulation of heat or air through the bottom of the rack, these being particularly desirable when the racks are stacked for baking.

The opposite longitudinal side edges of the bottom of the rack are bent downwardly into angular flanges 7 and the opposite ends are bent downwardly into flanges 8, the side and end flanges 7 and 8 being connected in a continuous perimetrical flange which serves both as a leg support and a means for nesting with upwardly disposed end handles 9, of a similarly constructed rack, fixed at opposite ends of the bottom of the rack. These handles 9 are in the form of a rod with its opposite ends 10 bent at right angles to be fixed, as by welding, to the rack bottom and provide hand holds 11. The length of these handles is slightly less than the width of the bottom of the rack, between side flanges 7, and are spaced slightly inward from the end flanges 8 so that the top of the handles of one rack will seat in nested relation with the bottom of a similar rack superimposed thereon. The side and end flanges prevent the racks, when stacked, from being disposed laterally.

While these flanges 7 and 8 need to be only in the corners of the rack for effecting nesting or serving as leg supports, they are preferably made continuous around the edge of the bottom of the rack in order to reinforce same and prevent it from being bent.

The pie plate openings 4 in the rows are spaced so that adjacent plates inserted therein, each with a rim surrounding a dished portion, will be sufficiently separated to avoid interference between their adjacent rims. Then, too, the handles 9 are placed at the ends of the racks sufficiently removed from the terminal transverse rows of openings for the rims of the plate, next to the handles, so as not to interfere with the racks being filled and emptied. Furthermore, this positioning of the handles also permits the racks to be easily lifted.

The backing of the edges of the pie is uniform as it seats upon the top of the rims of the plate which are preferably flat to seat on the portions of the rack which surround each of the pie plate openings 4.

The sheet metal rack bottom cannot only be easily provided with the side and end flanges for reinforcement and bottom leg supports, as well as nesting means, but it also provides a top smooth and flat surface which can be easily cleaned by simply scraping off any drippings from the pie fillings.

From the foregoing description of the construction of the pie plate racks, their use will be obvious. I am aware that there may be various changes in details of construction without departing from the spirit of the invention, and, therefore, the invention is claimed broadway as indicated by the appended claims.

Having thus described the invention, what is claimed as new and useful and desired to be secured by United States Letters Patent is:

1. A pie plate rack for baking and storing, comprising a rectangular bottom of sheet metal, having transverse and longitudinal rows of pie plate openings formed therein, downwardly extending transverse and longitudinal flanges meeting and joined at each of the corners of the bottom, and upwardly extended transverse handles fixed to the opposite ends of the bottom of the rack, said handles being provided with hand holds and being of a transverse length substantially equal to the width of the rack bottom between the opposite longitudinal flanges to permit said handles nesting in the flange corners of a similarly constructed rack seated on said handles.

2. The rack of claim 1 in which the downwardly extending transverse and longitudinal flanges extend throughout the length and width of the botttom of the rack on opposite sides and ends to provide a continuous perimetrical flange.

3. The pie plate rack of claim 2 having transverse and longitudinal rows of air perforations formed between the transverse and longitudinal rows of pie plate openings and in staggered relation therewith.

4. A pie plate rack for baking and storing, comprising a rectangular bottom of sheet metal, provided with pie plate openings therein, downwardly extending transverse and longitudinal flanges at each of the corners of the bottom, and upwardly extending transverse handles fixed to the opposite ends of the bottom of the rack, said handles being provided with hand holds and being of a transverse length substantially equal to the width of the rack bottom between the opposite longitudinal flanges to permit said handles nesting in the flange corners of a similarly constructed rack seated on said handles.

References Cited in the file of this patent

UNITED STATES PATENTS

| | | |
|---|---|---|
| 1,351,387 | Jesse | Aug. 31, 1920 |
| 1,708,474 | Hoffman | Apr. 9, 1929 |
| 1,739,895 | Gamble | Dec. 17, 1929 |
| 2,210,521 | Bemis | Aug. 6, 1940 |
| 2,513,709 | Blackwell | July 4, 1950 |
| 2,565,046 | Rooth | Aug. 21, 1951 |
| 2,747,748 | Barefoot | May 29, 1956 |